March 5, 1963   R. G. SWEET   3,079,993
SCRAPER-CONDENSER UNIT
Filed July 2, 1959   3 Sheets-Sheet 1

Fig. I.

INVENTOR
Roger G. Sweet
BY
Charles J. Elderkin
ATTORNEY

March 5, 1963  R. G. SWEET  3,079,993
SCRAPER-CONDENSER UNIT
Filed July 2, 1959  3 Sheets-Sheet 2

INVENTOR
Roger G. Sweet
BY
Charles J. Elderkin
ATTORNEY

INVENTOR
Roger G. Sweet
BY
Charles J. Ellerkin
ATTORNEY

United States Patent Office 3,079,993
Patented Mar. 5, 1963

3,079,993
SCRAPER-CONDENSER UNIT
Roger G. Sweet, New Canaan, Conn., assignor to Chilean Nitrate Sales Corporation, New York, N.Y., a corporation of New York
Filed July 2, 1959, Ser. No. 824,661
1 Claim. (Cl. 165—94)

This invention relates to novel apparatus for effecting the continuous condensation and removal of sublimable materials. More particularly, the invention involves the provision of an improved scraping-type condenser unit that is capable of effecting the continuous condensation and removal of materials which normally form an adherent layer in contact with the condensing surface including, by way of illustration, titanium tetraiodide, iodine, sulfur, phosphorus, zinc oxide, molybdenum oxide, phthalic anhydride, pyrogallic acid and ice, among others.

Many commercially available condenser units as used in condensation and sublimation applications are not suitable for continuous operations because of the gradual limiting action caused by the accumulation of condensed solid material on the condensing or heat-transfer surfaces. Apart from the fact that such units must be operated on a batch basis to permit intermittent removal of accumulated solids, the units are relatively inefficient during the terminal portion of their cycle owing to the steadily decreasing heat-transfer rates experienced as a result of the thermal barrier presented by the solid material as it accumulates on the heat-transfer surface.

Heretofore, attempts have been made to overcome the foregoing disadvantages through the provision of mechanical scraping attachments on the condenser units which are intended to effect removal of deposited solids from the heat-transfer surface throughout the condensation cycle. Conventional units of this type normally utilize relatively large scraper blades to traverse the collecting surface, i.e., scrapers of cutting area equal to one full dimension of the condensing vessel such as length (i.e. a linear blade) or circumference (i.e. a helical blade) in the case of cylindrical collecting vessels, and while these units are effective for the purpose intended when used in conjunction with some sublimable materials, we have found that they are totally unsatisfactory when used with sublimable materials of the general class defined hereinbefore whose physical properties render them highly resistant to removal from the condensing surface. Thus, the enormous forces required to accomplish the desired separation of the condensed material from the heat-transfer surfaces of such units render them impractical. By way of illustration, in actual operations with condensed films of iodine and titanium tetraiodide, it was found that a force of about 300 pounds per linear inch was required to remove the film either from the surface of the metal condenser vessel or from a layer of the iodine or iodide previously accumulated on such surface.

It is the principal object of this invention to provide an improved scraper-condenser unit which utilizes the mechanical action of a relatively low-torque traveling blade to minimize the problems of steadily decreasing heat-transfer rates and removal of solids from the heat-transfer surface.

In essence, the condenser structure of the invention effects the removal of condensed solids from a cooled, vertically disposed, cylindrical condensing surface by means of a relatively small scraper blade which is rotated and reciprocated along the axis of the cylinder in much the same manner as the action of a machine tool in machining the inner surface of a cylinder or pipe. In operation, the relatively small cutting area traversed by the scraper blade results in substantially reduced power requirements, whereas the removal of condensed solids by the traveling blade continuously presents new condensation surfaces, thereby providing uninterrupted and relatively steady-state condensing action.

It is believed that the scraper-condenser structure of the invention may be best understood by reference to the following detailed description of a specific embodiment of the same taken in conjunction with the accompanying drawings wherein.

Figure 1:
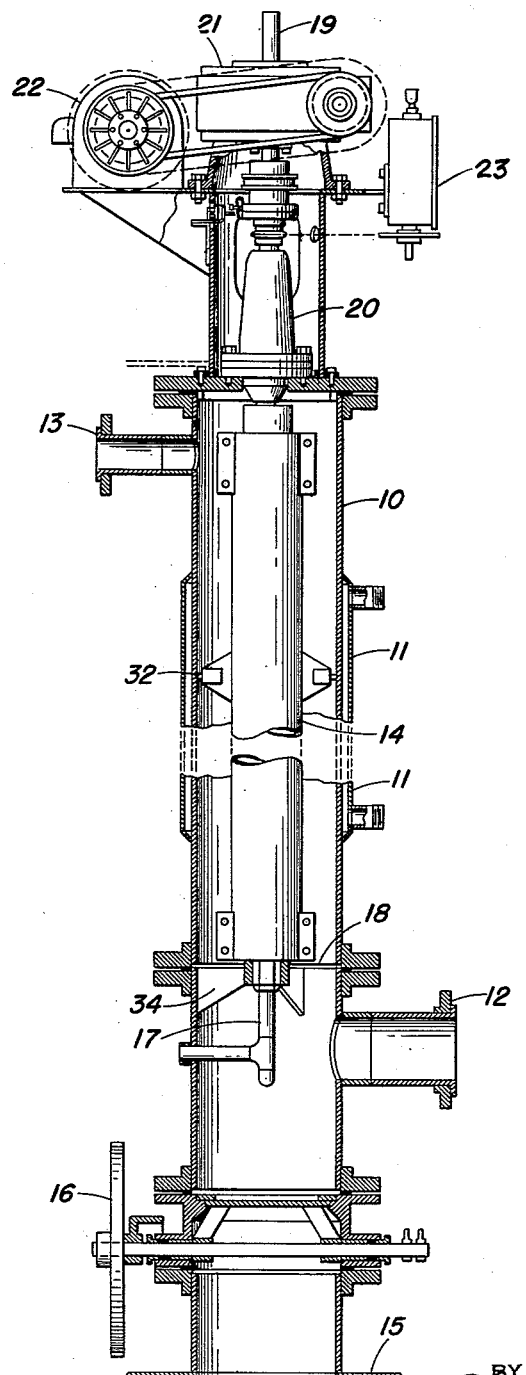
FIG. 1 is an elevational view, partly in section, of the overall scraper-condenser assembly illustrating the cooperative interrelationship of its component elements.

With reference to FIG. 1 of the drawings, the scraper-condenser consists of an external cylindrical shell or barrel 10 fitted with a cooling jacket 11. The vapors to be condensed are introduced into barrel 10 through a port 12 provided at the lower-end thereof. A similar port 13 at the upper-end of barrel 10 is the vacuum port for the system and serves to exhaust non-condensable gases from the barrel. Of course, ports 12 and 13 may be readily interchanged if it is desired to pass the vapors downwardly through the condenser.

Condensation occurs on the walls of barrel 10 at a temperature partially determined by the thermostatting liquid carried in jacket 11. The condensed solid material is scraped from the walls by a blade mechanism 14, from whence it falls into a receiver vessel (not shown) mounted at the lower-end of barrel 10 against mounting flange 15. In the embodiment illustrated in the drawing, a solids valve 16 is provided above the receiving vessel for intermittent discharging of accumulated loose solids from the barrel, but this control may be eliminated in actual practice and the solids discharged directly into the receiving vessel.

A tubular re-entrant heater 17 is provided for heating the scraping mechanism to prevent condensation thereon. A support 18 serves as the bottom bearing for the scraping mechanism. Power to the scraping mechanism 14 is supplied via a shaft 19 through a packing gland 20 by means of a speed reducer unit 21 driven by an electric motor 22. The direction of the motor and, in turn, the direction of travel of scraping mechanism 14, is reversed appropriately by a pair of microswitches at either end of the travel of a following nut (not shown) mounted on a screw in control box 23 which is synchronized with the travel of the scraper blade.

Figure 2:
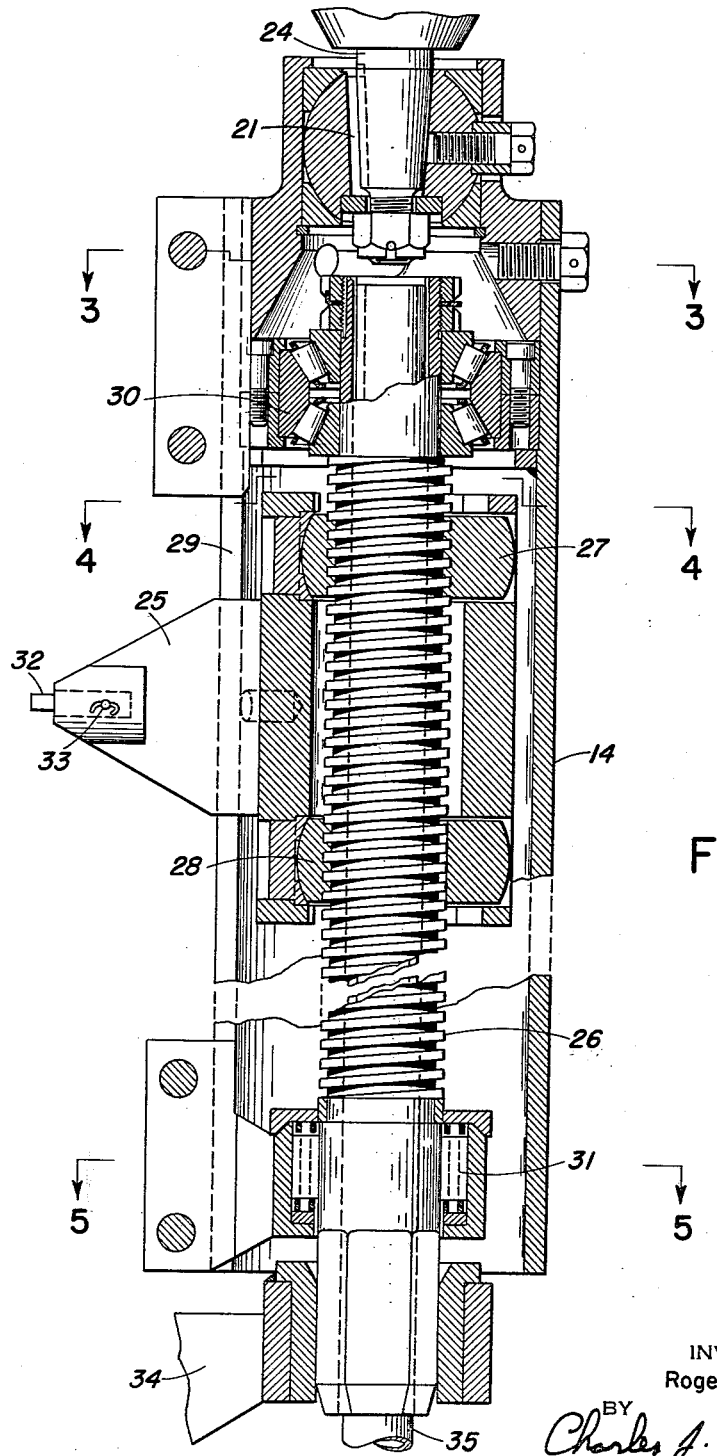
FIG. 2 is an elevational section taken along line 2—2 of FIG. 4, illustrating details of the scraper assembly of the unit shown in FIG. 1.
Figure 3:
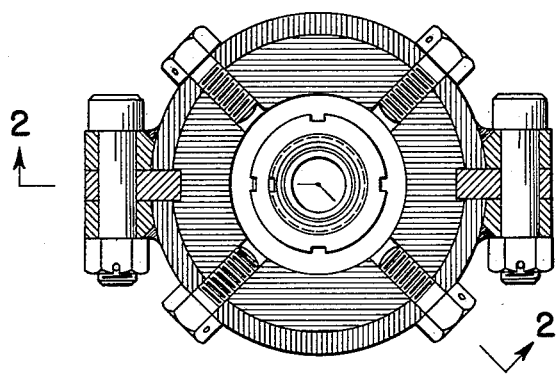
FIG. 3 is a cross-sectional view taken along line 3—3 of FIG. 2, illustrating the slotted coaxial-tube scraper blade drive utilized in the structure of FIG. 1.
Figure 4:
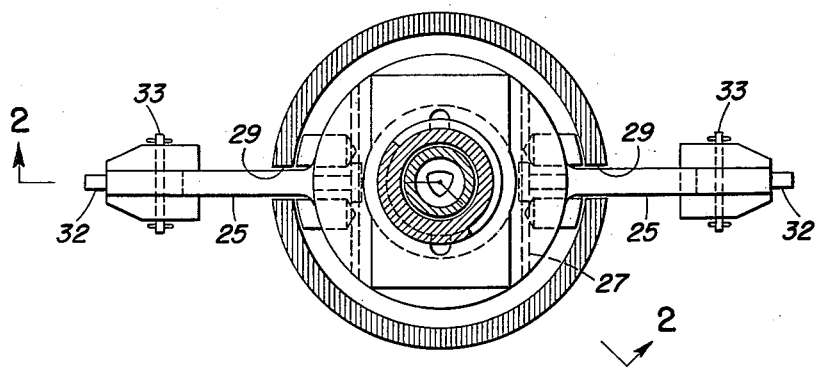
FIG. 4 is a cross-sectional view taken along line 4—4 of FIG. 2, illustrating further details of the slotted blade drive.
Figure 5:
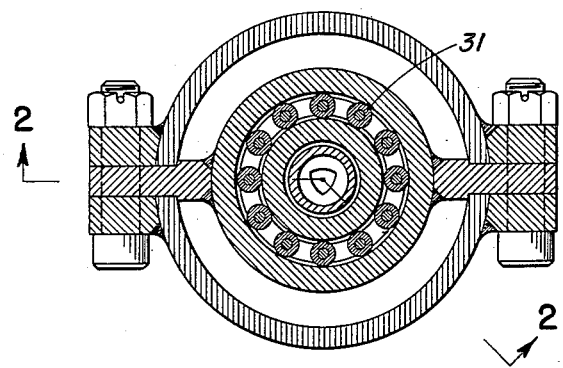
FIG. 5 is a cross-sectional view taken along line 5—5 of FIG. 2, illustrating the lower ball-bearing assembly of the scraper-condenser.

With reference to FIG. 2 of the drawing there are shown the essential details of the scraper assembly. Torque is applied to the assembly through shaft 24; the drive mechanism for this shaft preferably including a shear pin (not shown) for mechanical protection. The actual scraper assembly 25 rides on a stationary screw 26 and is supported by a nut 27 and a plain bearing 28. Torque is transferred to the blade assembly by means of a coaxial-slotted column 29 (FIG. 4) which turns on roller bearing assemblies at the top (30) and bottom (31, FIGS. 2 and 5) of the unit. Coaxial-slotted column 29 is coupled, in turn, to drive shaft 24. In the section illustrated in FIG. 2, one type of upper bearing 30 has been illustrated, but as will be appreciated, a variety of other bearing assemblies could be used in place of the one illustrated. The actual scraper element 32 is readily removable for replacement by means of a simple pin 33. The entire scraper assembly is supported within condenser barrel 10 by means of the spider support 34 mounted on the bottom thereof. The relationship of re-entrant heater 17 to the scraper assembly is shown by reference numeral 35 in FIG. 2.

In operation, the rotational, reciprocating action of the scraper assembly and its blade elements 32 serve to sweep small successive incremental sections of the deposited solids from the interior condensing area of barrel 10. The relatively small "cutting" area of the scraper blade materially reduces the torque requirements of the drive system, while still maintaining the thermal characteristics of the heat-transfer surface relatively constant under conditions of continuous operation.

Having thus described the subject matter of my invention, what it is desired to secure by Letters Patent is:

Apparatus for effecting continuous condensation and recovery of sublimable materials that comprises,
- a substantially cylindrical vessel having an externally cooled heat-transfer condensation surface formed around the internal periphery thereof;
- means for continuously supplying a vapor phase product to said vessel into contact with said heat-transfer condensation surface;
- a fixed screw axially located within said vessel and said heat-transfer condensation surface;
- a scraper-blade assembly engaging said screw and rotatably positioned axially of said heat transfer condensation surface, said scraper-blade contacting condensed product on said heat-transfer condensation surface and being of sufficient width to dislodge accumulated condensed product over only a relatively small area of said total heat-transfer condensation surface;
- means for continuously rotating said scraper-blade assembly around said heat-transfer condensation surface;
- means coacting with said screw for continuously reciprocating said rotating scraper-blade assembly along the axis of said heat-transfer condensation surface, said reciprocating means being located adjacent to and coaxially around said screw; and
- means for collecting condensed product dislodged from said heat-transfer condensation surface by said scraper-blade assembly.

References Cited in the file of this patent
UNITED STATES PATENTS

| | | |
|---|---|---|
| 1,065,382 | Meikleham | June 24, 1913 |
| 1,463,216 | Krase et al. | July 31, 1923 |
| 2,215,968 | Livingston | Sept. 24, 1940 |
| 2,245,077 | Muskat et al. | June 10, 1941 |
| 2,320,933 | Ilgen | June 1, 1943 |
| 2,883,162 | Rapson | Apr. 21, 1959 |